United States Patent
Noda et al.

(10) Patent No.: US 12,314,062 B2
(45) Date of Patent: May 27, 2025

(54) ROUTE DATA CREATION DEVICE AND WORK MACHINE

(71) Applicant: HONDA MOTOR CO., LTD., Tokyo (JP)

(72) Inventors: Hiroki Noda, Wako (JP); Takaaki Nishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 279 days.

(21) Appl. No.: 18/192,751

(22) Filed: Mar. 30, 2023

(65) Prior Publication Data
US 2024/0329638 A1    Oct. 3, 2024

(51) Int. Cl.
*G05D 1/229* (2024.01)
*A01D 34/00* (2006.01)
*A01D 101/00* (2006.01)
*G05D 105/15* (2024.01)

(52) U.S. Cl.
CPC ......... *G05D 1/2297* (2024.01); *A01D 34/008* (2013.01); *A01D 2101/00* (2013.01); *G05D 2105/15* (2024.01)

(58) Field of Classification Search
CPC ...... G05D 1/2297; G05D 1/248; G05D 1/646; G05D 1/65; G05D 2105/15; G05D 2107/23; G05D 2109/10; A01D 34/008; A01D 2101/00
See application file for complete search history.

(56) References Cited

U.S. PATENT DOCUMENTS

| | | | | |
|---|---|---|---|---|
| 5,204,814 A | * | 4/1993 | Noonan | B60L 15/2036 701/25 |
| 2007/0198159 A1 | * | 8/2007 | Durkos | G05D 1/0246 701/50 |
| 2015/0331423 A1 | * | 11/2015 | Volger | G05D 1/6484 701/25 |
| 2017/0144702 A1 | * | 5/2017 | Dang | B62D 6/001 |
| 2022/0312670 A1 | | 10/2022 | Sugino | |
| 2023/0015153 A1 | * | 1/2023 | Morimoto | A01B 69/008 |

FOREIGN PATENT DOCUMENTS

| | | | | |
|---|---|---|---|---|
| JP | 2001344017 A | * | 12/2001 | |
| JP | 2022-155101 A | | 10/2022 | |
| WO | WO-2022097342 A1 | * | 5/2022 | A47L 11/4011 |

* cited by examiner

*Primary Examiner* — Michael J Zanelli
(74) *Attorney, Agent, or Firm* — Rankin, Hill & Clark LLP

(57) ABSTRACT

Nodes on a travel route are classified into a special node and a normal node, depending on whether or not stopping occurs on the travel route, and are set. The special node includes a stopping position where a working machine comes to a stop on the travel route and a control parameter is changed, and further includes an imaginary arrival determination line in order to determine that the working machine has arrived at the second determination region, the imaginary arrival determination line passing through the stopping position.

8 Claims, 15 Drawing Sheets

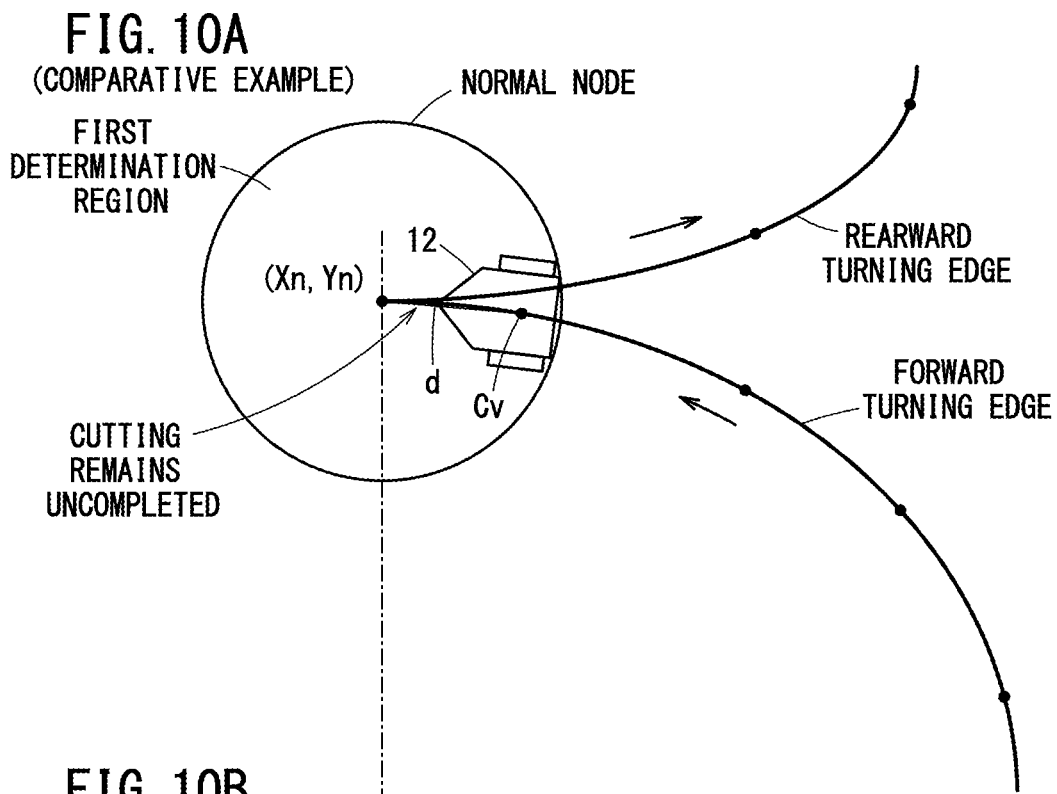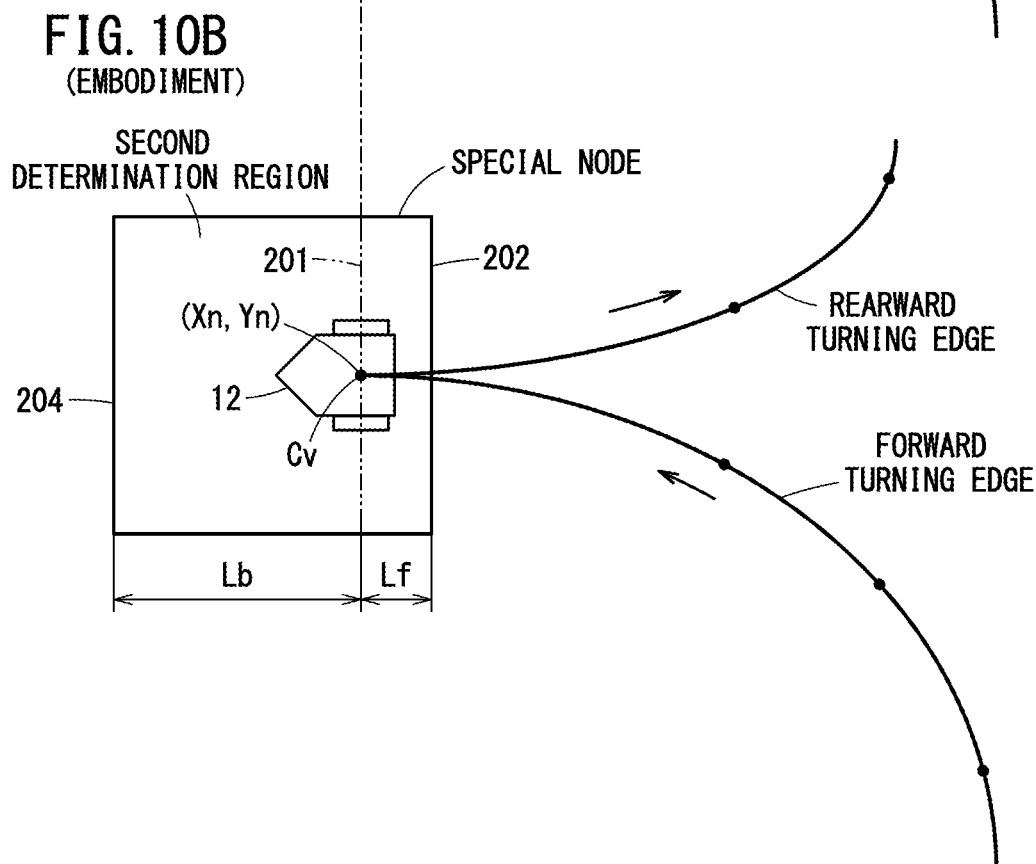

(COMPARATIVE EXAMPLE)

(EMBODIMENT)

(COMPARATIVE EXAMPLE 1)

(EXEMPLARY MODIFICATION 1)

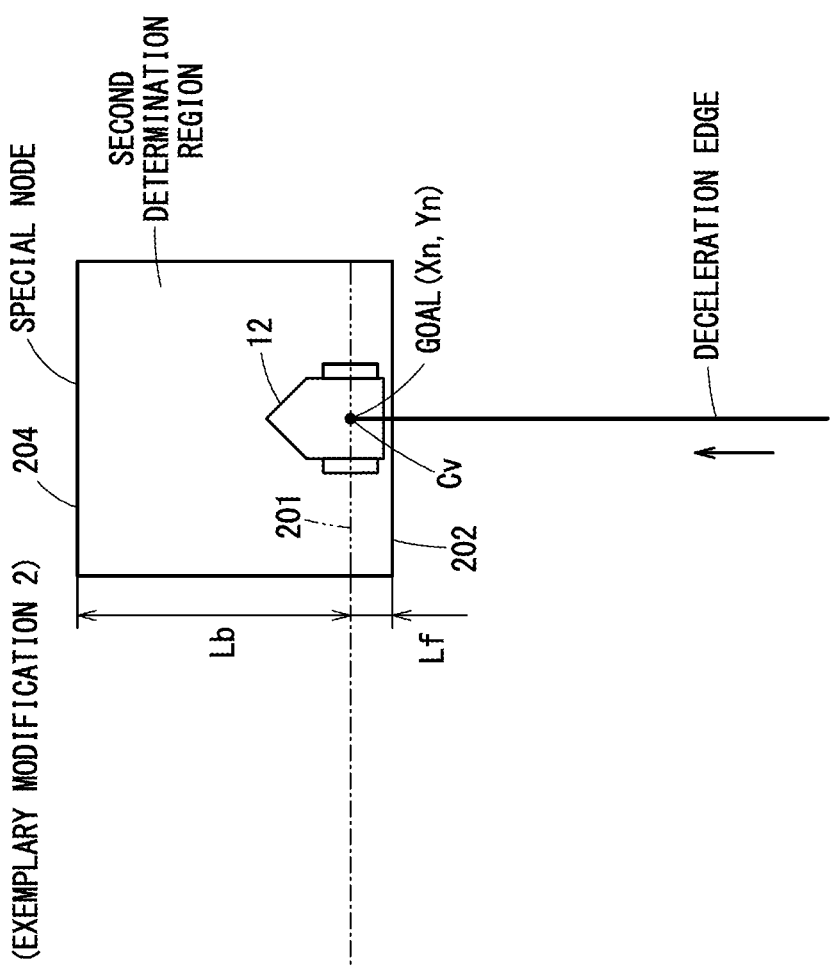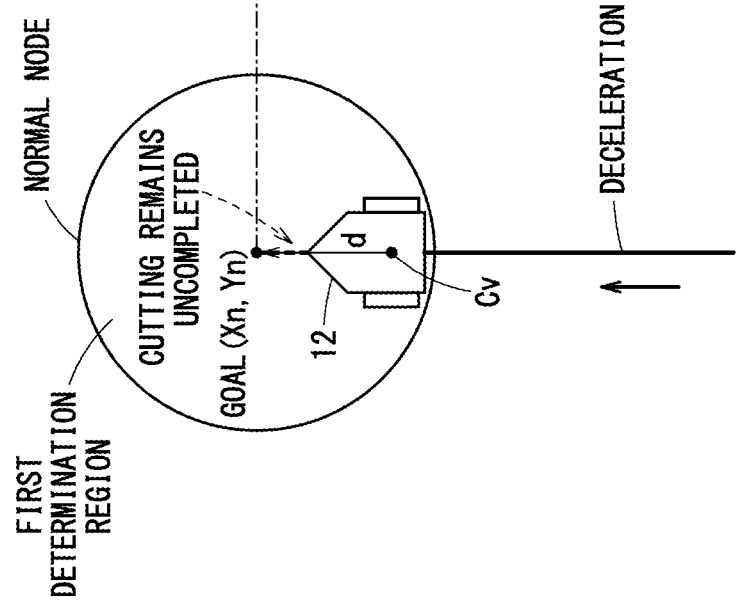
FIG. 13A (COMPARATIVE EXAMPLE 2)
FIG. 13B (EXEMPLARY MODIFICATION 2)

(BACKGROUND TECHNIQUE)

(BACKGROUND TECHNIQUE)

(BACKGROUND TECHNIQUE)

ROUTE DATA CREATION DEVICE AND WORK MACHINE

BACKGROUND OF THE INVENTION

Field of the Invention

The present invention relates to a route data creation device configured to create a travel route for a working machine that is capable of traveling autonomously, as well as to a working machine (work machine).

Description of the Related Art

For example, in JP 2022-155101 A, there is disclosed a node (an intermediate point) at which a working machine, which is capable of traveling autonomously, makes a turn (refer to FIG. 6A and paragraph of JP 2022-155101 A).

SUMMARY OF THE INVENTION

However, the working machine disclosed in JP 2022-155101 A has a problem in that a region in which working remains uncompleted is generated in the vicinity of the turning position.

The present invention has the object of solving the aforementioned problem.

A route data creation device according to one aspect of the present invention is configured to create a travel route from a start to a goal of a working machine configured to travel autonomously, based on a teaching trajectory, the route data creation device including: one or more processors that execute computer-executable instructions stored in a memory, wherein the one or more processors execute the computer-executable instructions to cause the route data creation device to: register, for each of discrete positions along the travel route, a speed-related control parameter acquired at a time when the teaching trajectory is acquired; set, on the travel route, a normal node containing a non-stopping position where a value of the control parameter is changed, and a special node containing a stopping position where a value of the control parameter is changed; set, in the normal node, a first determination region to determine that the working machine has arrived at the non-stopping position which lies at a constant distance in a radial direction from a center of the normal node; and set, in the special node, a second determination region which has an imaginary arrival determination line to determine that the working machine has arrived at the stopping position.

A working machine according to another aspect of the present invention is configured to travel autonomously along a travel route based on a teaching trajectory, wherein: a speed-related control parameter acquired at a time when the teaching trajectory is acquired is registered for each of discrete positions along the travel route; on the travel route, there are set a normal node containing a non-stopping position where a value of the control parameter is changed, and a special node containing a stopping position where a value of the control parameter is changed; in the normal node, a first determination region is set to determine that the working machine has arrived at the non-stopping position which lies at a constant distance in a radial direction from a center of the normal node; and in the special node, a second determination region is set having an imaginary arrival determination line to determine that the working machine has arrived at the stopping position, the working machine including a position sensor configured to detect a position of the working machine itself, and one or more processors configured to execute computer-executable instructions stored in a memory, wherein the one or more processors execute the computer-executable instructions to cause the working machine to determine whether or not the position of the working machine itself detected by the position sensor has arrived at a position on the imaginary arrival determination line.

In the invention according to the one aspect, the nodes on the travel route are classified into special nodes and normal nodes depending on whether or not stopping occurs on the travel route, and are set. The special node includes a stopping position where the working machine comes to a stop on the travel route and a control parameter is changed, and further includes an imaginary arrival determination line in order to determine that the working machine has arrived at the second determination region, the imaginary arrival determination line passing through the stopping position. Thus, compared to a case in which the normal node is set, an uncut region in which working remains uncompleted can be reduced.

In the invention according to the other aspect, a working machine capable of reducing an uncut region in which work remains uncompleted is provided.

The above and other objects, features, and advantages of the present invention will be easily understood from the following description of an embodiment when taken in conjunction with the accompanying drawings.

BRIEF DESCRIPTION OF THE DRAWINGS

FIG. 10A is an explanatory diagram of a normal node in a comparative example in which a K-turn is carried out;

FIG. 10B is an illustration of a special node in accordance with an embodiment in which such a K-turn is carried out;

FIG. 13A is a schematic diagram for describing a route following characteristic for a case in which the working machine arrives at a goal of a normal node in a Comparative Example 2;

FIG. 13B is a schematic diagram for describing a route following characteristic for a case in which the working machine arrives at a goal of a special node in the Comparative Example 2;

DETAILED DESCRIPTION OF THE INVENTION

Embodiment

[Configuration]

Hereinafter, a description will be given as an example of a route data creation device and a working machine according to the present invention, taking as an example a playback data creation device 10 according to an embodiment.

Figure 1:
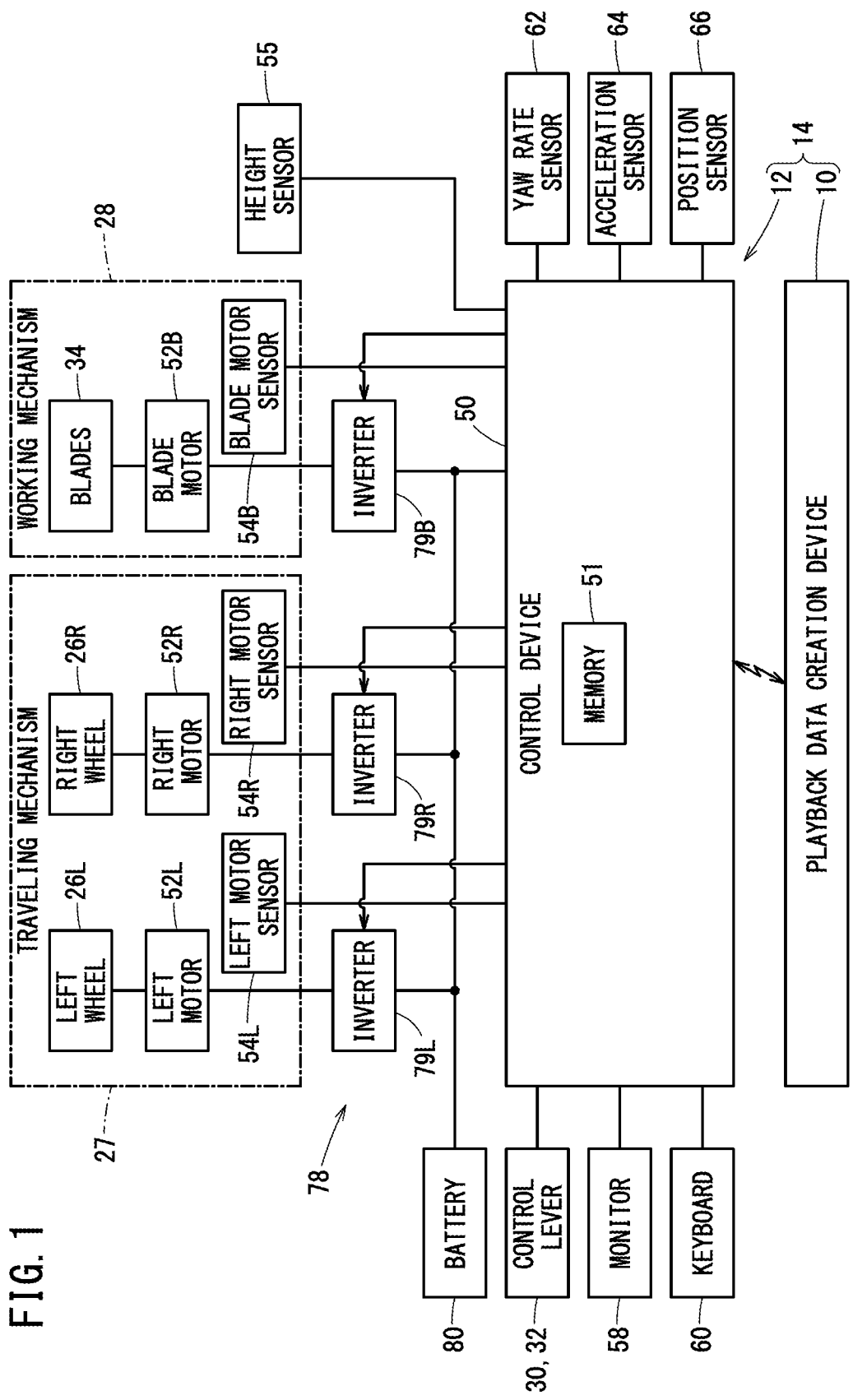
FIG. 1 is a schematic block diagram showing an example of the configuration of a playback data creation system including a playback data creation device, and a working machine according to an embodiment of the present invention.

FIG. 1 is a schematic block diagram showing an example of the configuration of a playback data creation system 14 including the playback data creation device 10, and a working machine 12 that is capable of traveling autonomously along a working route using the playback data created by the playback data creation device 10.

Moreover, the working machine 12 is configured to be capable of traveling autonomously without the need for a worker such as a driver, and together therewith, is configured to be capable of traveling manually by the worker serving as the driver.

According to the present embodiment, although the working machine 12 is a lawn mower, the working machine 12 is not limited to being a lawn mower, but may be a grass cutting machine, a tractor, a forklift, or another type of working machine equipped with a working tool (for example, the blades 34 on a lawn mower).

Figure 2:
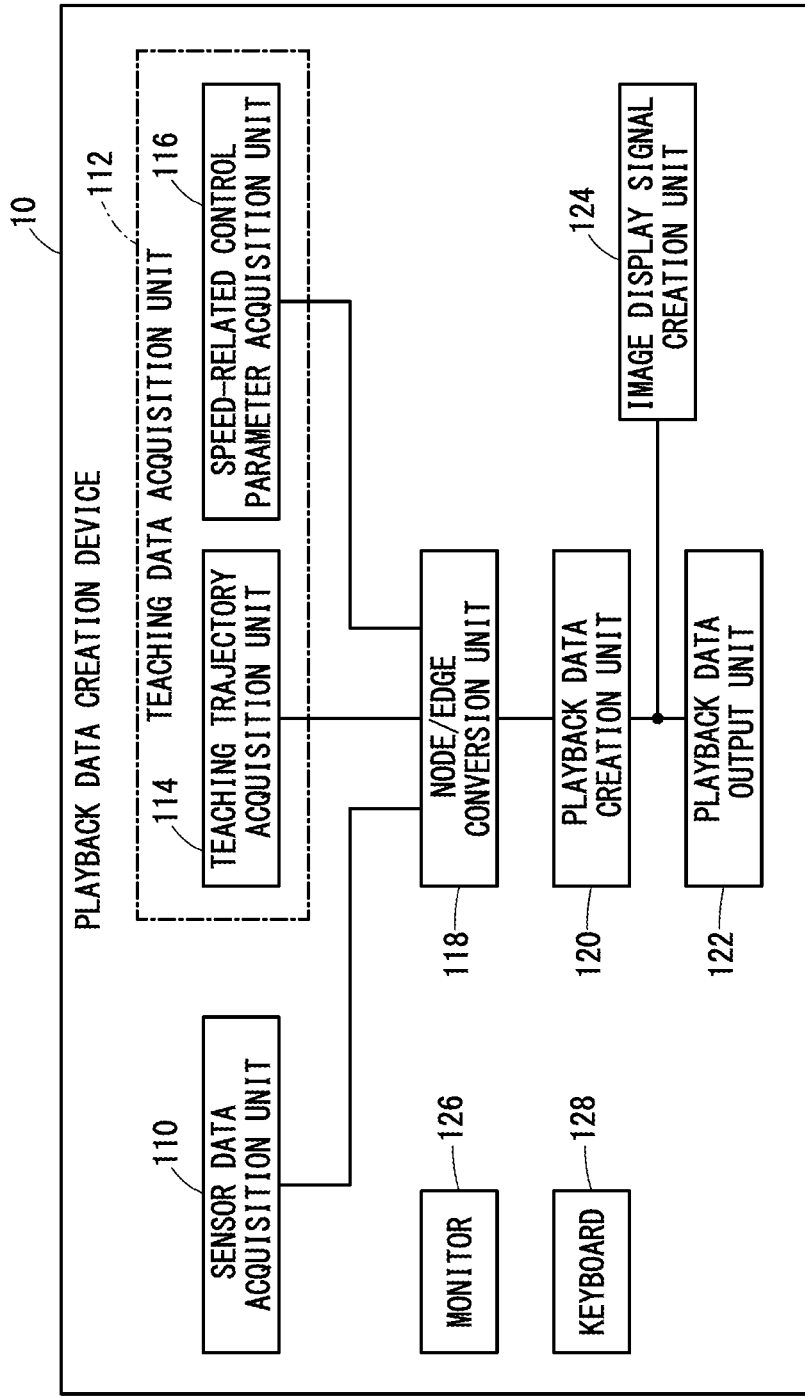
FIG. 2 is a functional block diagram of the playback data creation device shown in FIG. 1.

FIG. 2 is a functional block diagram showing an inner configuration of the playback data creation device 10 shown in FIG. 1. The playback data creation device 10 is constituted by a personal computer (PC), a mobile PC, or a server having a monitor 126 serving as a display, and a keyboard 128 serving as an input device.

The playback data creation device 10 and the working machine 12 are configured to be capable of communicating with each other.

Figure 3:
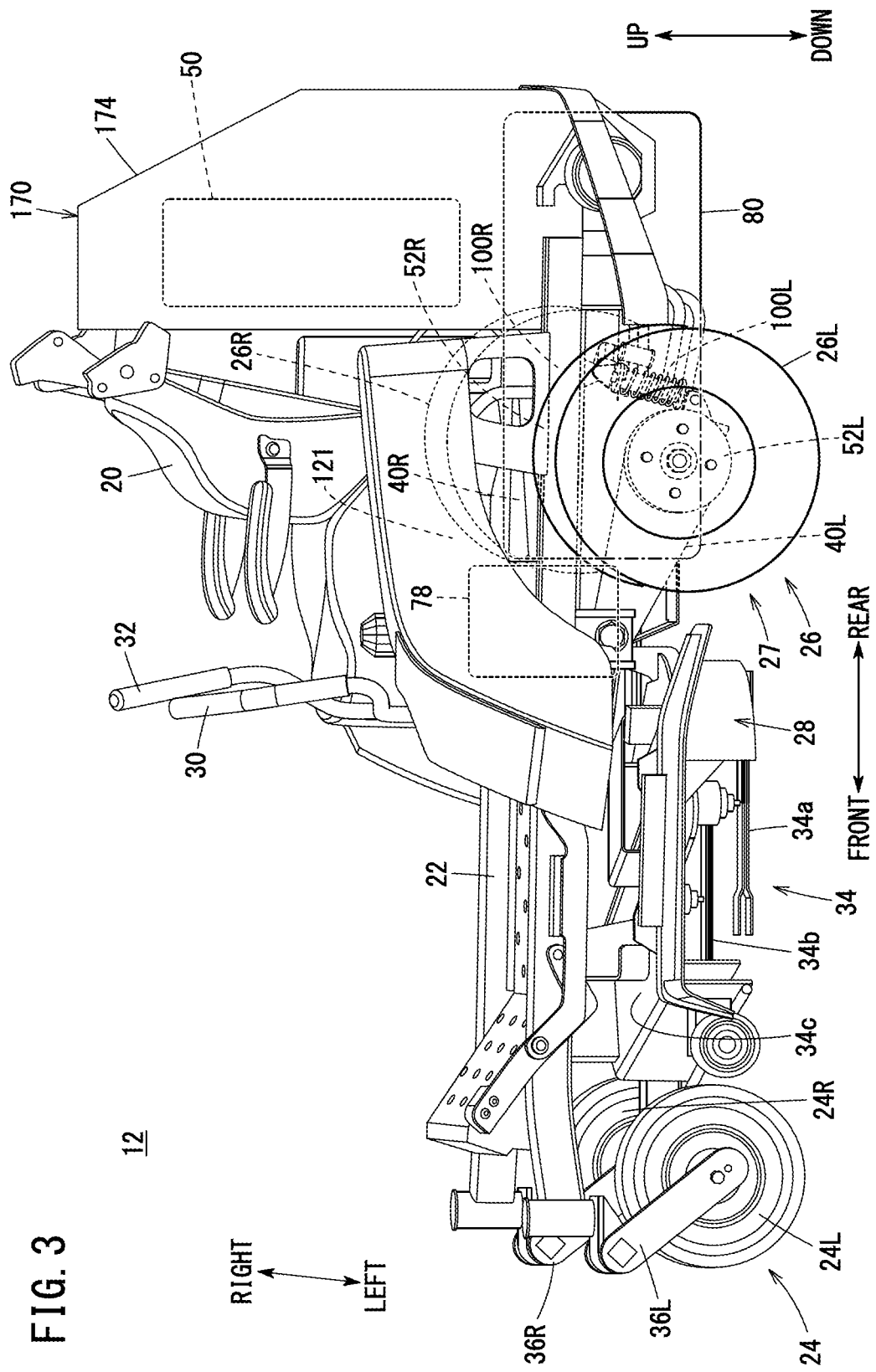
FIG. 3 is a schematic perspective view of the working machine as seen from a left side thereof.

FIG. 3 is a schematic perspective view of the working machine 12 as seen from a left side thereof.

Figure 4:
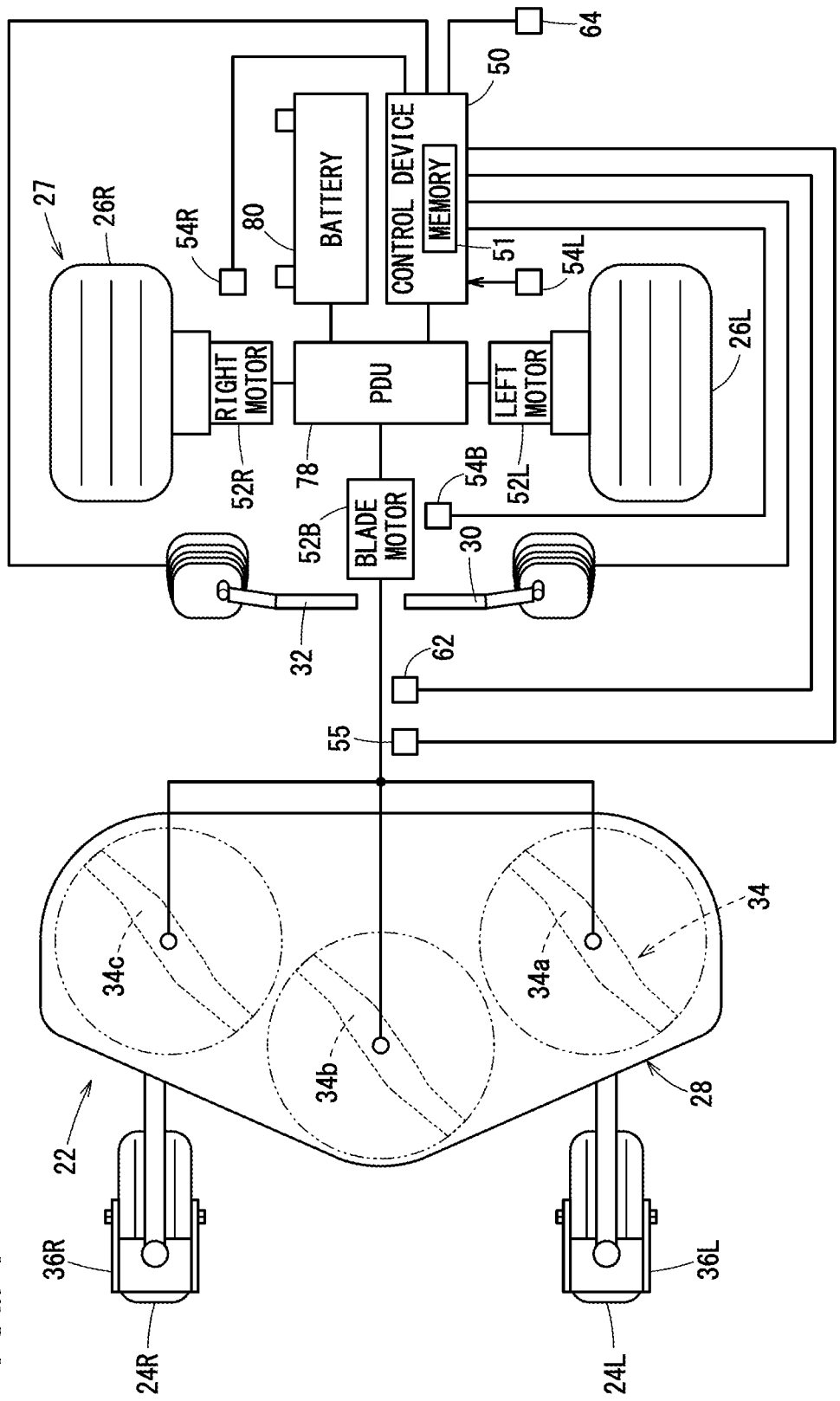
FIG. 4 is a schematic diagram of an electricity and power system when the working machine is viewed from above.

FIG. 4 is a schematic diagram of an electricity and power system of the working machine 12 including a traveling mechanism 27 and a working mechanism 28 when the working machine 12 is viewed from above.

First, the mechanical configuration of the working machine 12 will be described with reference to FIG. 3 and FIG. 4.

In FIG. 3, the left direction and the right direction refer to the left and right directions of a worker (not shown) as a driver who is seated on a seat 20 of the working machine 12. The left-right direction is synonymous with a vehicle widthwise direction. The front-rear direction is a horizontal direction perpendicular to the vehicle widthwise direction, and is synonymous with a vehicle lengthwise direction. The upper-lower direction is a vertical direction perpendicular to the vehicle widthwise direction and the vehicle lengthwise direction, and is synonymous with a vehicle heightwise direction.

As shown in FIG. 3, the working machine 12 includes a vehicle body frame 22, a pair of front wheels 24 (a left front wheel 24L and a right front wheel 24R) which are driven wheels, and a pair of rear wheels 26 (a left rear wheel 26L and a right rear wheel 26R) which are driving wheels that constitute the traveling mechanism 27, and the working mechanism 28.

The working mechanism 28 is positioned below the vehicle body frame 22 and between the front wheels 24 and the rear wheels 26 in the front-rear direction.

The left rear wheel 26L and the right rear wheel 26R, respectively, are rotationally driven by a left motor (a left traveling motor) 52L (see FIG. 4) and a right motor (a right traveling motor) 52R (see FIG. 4).

The working machine 12 is further equipped with a pair of control levers 30 and 32, a battery 80, and an autonomous control unit 170.

The autonomous control unit 170 includes a control device 50, and a housing 174 in which the control device 50 is accommodated. The housing 174 is arranged upwardly of the battery 80 at a rear portion of the working machine 12.

The worker sits on the seat 20, and operates the control levers 30 and 32. Accompanying this operation, the working machine 12 moves forward, moves rearward, stops or turns, or alternatively, the working mechanism 28 moves upward and downward, or the three blades 34 (34a to 34c) provided in the working mechanism 28 rotate or stop.

For example, by the control levers 30 and 32 being operated to rotate the pair of left and right rear wheels 26 in the forward direction at the same rotational speeds, the working machine 12 moves forward, and by the pair of left and right wheels 26 being rotated in the rearward direction at the same rotational speeds, the working machine 12 moves rearward.

By the pair of left and right rear wheels 26 being rotated at the same rotational speeds and in different directions, the working machine 12 can change its orientation (turn) on the spot without moving forward or moving rearward, or in other words, can perform a so-called ultra-pivot turn.

More specifically, in the case of stopping and making a right turn (right turn), the right rear wheel 26R is made to move rearward, and together therewith, the left rear wheel 26L is made to move forward. In the case of making a left turn (left turn), the left rear wheel 26L may be made to move rearward, and together therewith, the right rear wheel 26R may be made to move forward.

Moreover, in the case of turning right (making a right turn) or turning left (making a left turn) without stopping, each of the wheel speeds of the rear wheels 26R and 26L may be adjusted, in a manner so as to bring about a predetermined angular speed (turning speed).

The left front wheel 24L and the right front wheel 24R are connected to the vehicle body frame 22 respectively via a left front fork 36L and a right front fork 36R. In this case, since the left front fork 36L and the right front fork 36R are pivotally supported by the vehicle body frame 22, the left front wheel 24L and the right front wheel 24R can be freely turned leftward or rightward.

The left rear wheel 26L is connected to the vehicle body frame 22 via a left swing arm 40L and a left suspension 100L. The right rear wheel 26R is connected to the vehicle body frame 22 via a right swing arm 40R and a right suspension 100R.

A PDU (Power Drive Unit) 78 is arranged in a space 121 surrounded by the vehicle body frame 22 and under the seat 20.

Next, with reference to FIG. 1 and FIG. 4, a description will be given concerning an electrical circuit connection of the working machine 12.

The working machine 12 is equipped with the control device 50. A memory 51 is provided in the control device 50.

As shown in FIG. 1, the PDU 78 comprises three inverters 79B, 79L, and 79R.

Based on a command from the control device 50, the inverter 79L converts a DC (direct current) voltage of the battery 80 into a three-phase AC (alternate current) voltage, and applies the AC voltage to the left motor 52L that rotates the left rear wheel 26L. Data (a rotational speed, a direction of rotation) of a left motor sensor 54L that detects the rotational speed of the left motor 52L is acquired by the control device 50.

Based on a command from the control device 50, the inverter 79R converts a DC voltage of the battery 80 into a three-phase AC voltage, and applies the AC voltage to the right motor 52R that rotates the right rear wheel 26R. Data (a rotational speed, a direction of rotation) of a right motor sensor 54R that detects the rotational speed of the right motor 52R is acquired by the control device 50.

A traveling (moving forward, moving rearward, left and right turning, stopping) mechanism 27 is constituted by the left rear wheel 26L, the left motor 52L, the left motor sensor 54L, the right rear wheel 26R, the right motor 52R, and the right motor sensor 54R.

The remaining inverter 79B converts the DC voltage of the battery 80 into a three-phase AC voltage based on a command from the control device 50, and applies the AC voltage to a blade motor 52B that causes the three blades 34 to rotate. Data (a rotational speed) of a blade motor sensor 54B that detects the rotational speed of the blade motor 52B is acquired by the control device 50.

The working mechanism 28, which is constituted by the blades 34, the blade motor 52B, and the blade motor sensor 54B, is capable of being moved upward and downward by a vertical movement mechanism (not shown) that is controlled by the control device 50. Data from a height sensor 55 that detects a vertical distance of the blades 34 from the ground, i.e., a height position of the blades, is acquired by the control device 50.

The control device 50 acquires operation data of the control levers 30 and 32.

A monitor 58 serving as a display device and a keyboard 60 serving as an input device are connected to the control device 50.

The control device 50 acquires a yaw rate [rad/s], an acceleration [m/s$^2$], and a current position [latitude, longitude] of the working machine 12, from a yaw rate sensor 62, an acceleration sensor 64, and a position sensor 66 that are provided in the working machine 12.

In the position sensor 66, a GNSS (global positioning satellite system) sensor such as a GPS satellite positioning system sensor or the like is employed, and thereby detects a three-dimensional position of the working machine 12.

Moreover, it should be noted that, instead of the GNSS sensor, a geometry sensor that estimates the current position and orientation of the working machine 12 using geometric information may be used as the position sensor 66.

Based on the current position [latitude, longitude], the control device 50 calculates the current position [x, y] with the origin [x=0, y=0] serving as a reference position of the working route of the working machine 12.

Next, with reference to FIG. 2, a description will be given concerning the playback data creation device 10.

The playback data creation device 10 is constituted by a control device which is similar to the control device 50, and the control device is constituted by a computer having one or more processors (CPU), a memory (a storage device), an input/output interface, and an electronic circuit. The one or more processors (CPU) operate as various functional units by executing computer-executable instructions such as programs or the like that are stored in the memory.

Specifically, the playback data creation device 10 functions as a sensor data acquisition unit 110, a teaching data acquisition unit 112, a node/edge conversion unit 118, a playback data creation unit 120, a playback data output unit 122, and an image display signal creation unit 124.

The monitor 126, which serves as a display device, and a keyboard 128 serving as an input device are connected to the playback data creation device 10.

The teaching data acquisition unit 112 includes a teaching trajectory acquisition unit 114 and a speed-related control parameter acquisition unit (simply referred to as a parameter acquisition unit) 116.

Figure 5:
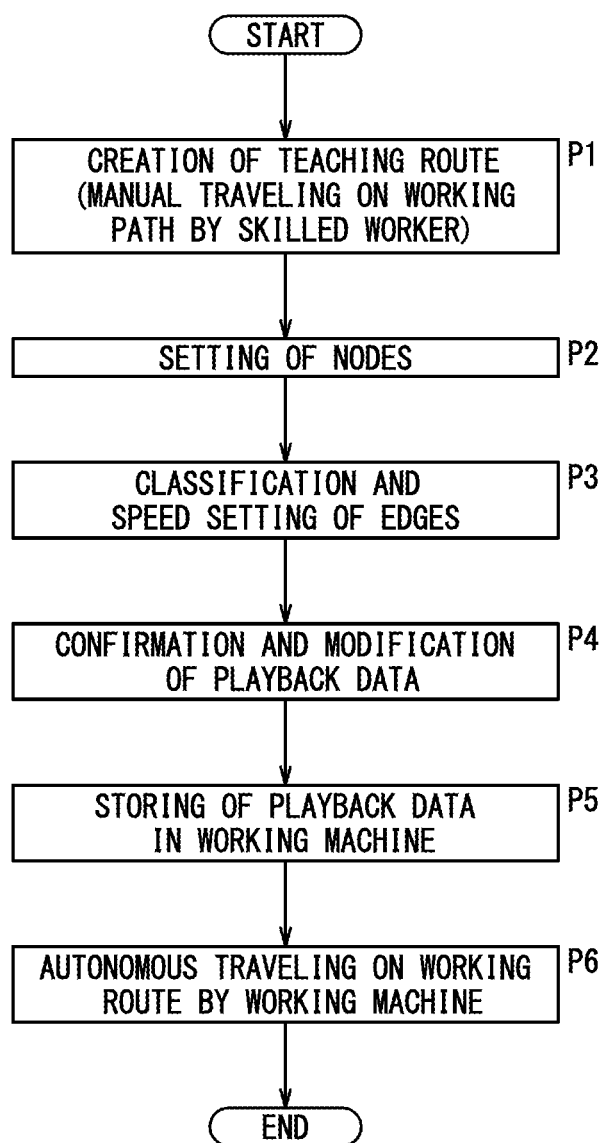
FIG. 5 is a schematic process diagram provided to describe operations of the playback data creation system.

A description will be given with reference to the process diagram of FIG. 5 concerning a procedure for creating the playback data for the working machine 12 by the playback data creation device 10 in the playback data creation system 14, which is basically configured in the manner described above.

Moreover, the playback data is created as route map data in which a traveling speed and an angular speed of the working machine 12, and a state of the blades 34, which change from moment to moment, are contained in association with sub-goals, which will be described later.

In a process P1, a skilled lawn mowing person who is seated on the seat 20 of the working machine 12 operates the control levers 30 and 32, and thereby manually travels along the working route by the traveling mechanism 27 while using the working mechanism 28, and carries out a lawn mowing operation on the working route. Teaching data is acquired via the teaching data acquisition unit 112 by manual traveling (a teaching operation) along the working route by the skilled worker.

The control device 50 acquires the following teaching data.

(1-1) First, the teaching trajectory acquisition unit 114 acquires discrete data (position data) of the teaching trajectory at every predetermined distance (a sampling distance) or every predetermined time interval (a sampling time interval) of the teaching trajectory (the working route). The discrete data can be obtained by the position sensor 66, or alternatively, as odometry information. A coordinate origin point of the working machine 12 itself is set at a center position Cv {Cv(x, y)} of the axle of the rear wheels 26 (also referred to as the center of the working machine 12).

(1-2) Secondly, at every time that the discrete data is acquired, the speed-related control parameter acquisition unit 116 acquires a "speed-related control parameter" at an acquisition point (an acquisition point in time) of the discrete data.

In this instance, the speed-related control parameters include the following parameter data, i.e., traveling direction flag data, traveling speed data, angular speed data (turning speed data), and blade control data (blade rotational speed data and blade height data).

Figure 6:
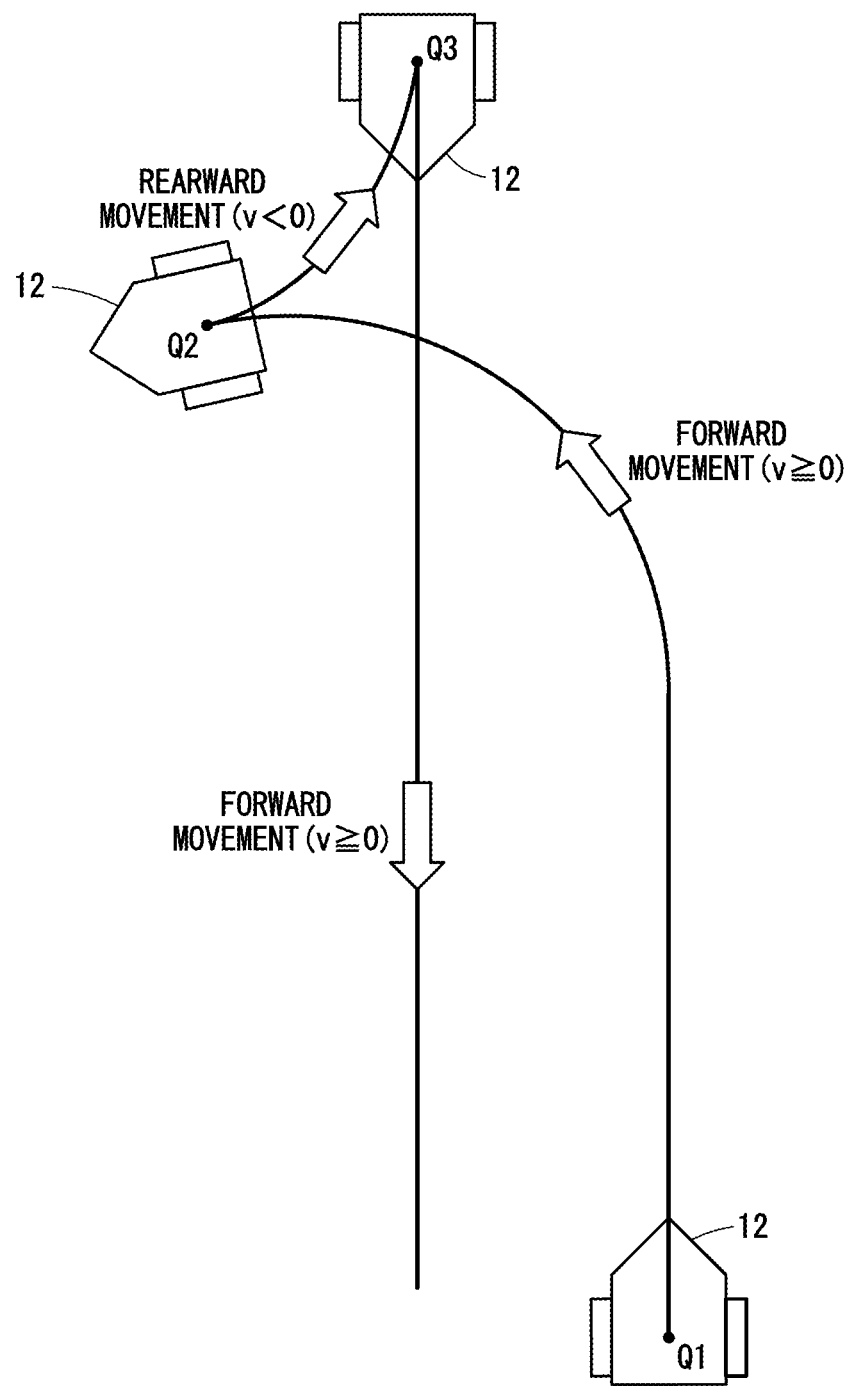
FIG. 6 is a schematic explanatory diagram in relation to setting of traveling direction flag data for determining a traveling direction of the working machine.

FIG. 6 is a schematic explanatory diagram in relation to the acquisition (setting and application) of the traveling direction flag data for determining the traveling direction of the working machine 12 by the control device 50.

At first, the parameter acquisition unit 116 initializes the traveling direction flag (fd) in accordance with the sign of the current speed (v) of the working machine 12. More specifically, if v≥0, then fd=1 (forward movement), and if v<0, then fd=−1 (rearward movement). At point Q1, the traveling direction flag is initialized to fd=1 (forward movement). Immediately after moving rearward from point Q2 which is a stopping position, then at a time when fd=1 and v<0, the traveling direction is updated from fd=1 to fd=−1 (rearward movement). At point Q3 which is a stopping position, then at a time when fd=−1 and v≥0, the traveling direction is updated from fd=−1 to fd=1 (forward movement).

In a process P2, the node/edge conversion unit 118 sets the nodes on the discrete data. The nodes are set (assigned) under the following conditions.

(2-1) The start and the goal are set to nodes.

(2-2) Deceleration data is calculated from the traveling speed data, or alternatively, deceleration data which is detected by the acceleration sensor 64 is acquired, and a deceleration occurrence position at which the deceleration data is less than or equal to a deceleration threshold value, is set to a node. The deceleration occurrence position may be obtained by a moving average of a difference in speed.

(2-3) A turning radius of the working machine 12 is calculated from the traveling speed data and the angular speed data, and a starting point and an ending point of a turning segment are set to nodes, where the turning segment is defined as a segment in which the turning radius is less than a turning radius threshold value.

(2-4) A starting point and an ending point of a blade segment in which the blade rotational speed becomes a value of 0 are set as nodes (a starting node and an ending node).

In a process P3, the node/edge conversion unit 118 carries out an edge classification and a speed setting. First, the node/edge conversion unit 118 divides (defines) the segments between adjacent nodes as edges.

In this case, the node/edge conversion unit 118 converts the teaching trajectory from the start to the goal into a playback route for the working machine 12 for the purpose of traveling autonomously, which is made up from a plurality of nodes, and edges connecting the nodes, based on the speed-related control parameter acquired on the teaching trajectory.

When converted into the playback route, the node/edge conversion unit 118 classifies each of the edges into a deceleration edge, a turning edge, or a straight edge (normal edge), which is a segment that is neither a deceleration edge nor a turning edge, and carries out a speed setting for each of such classifications.

Figure 7:
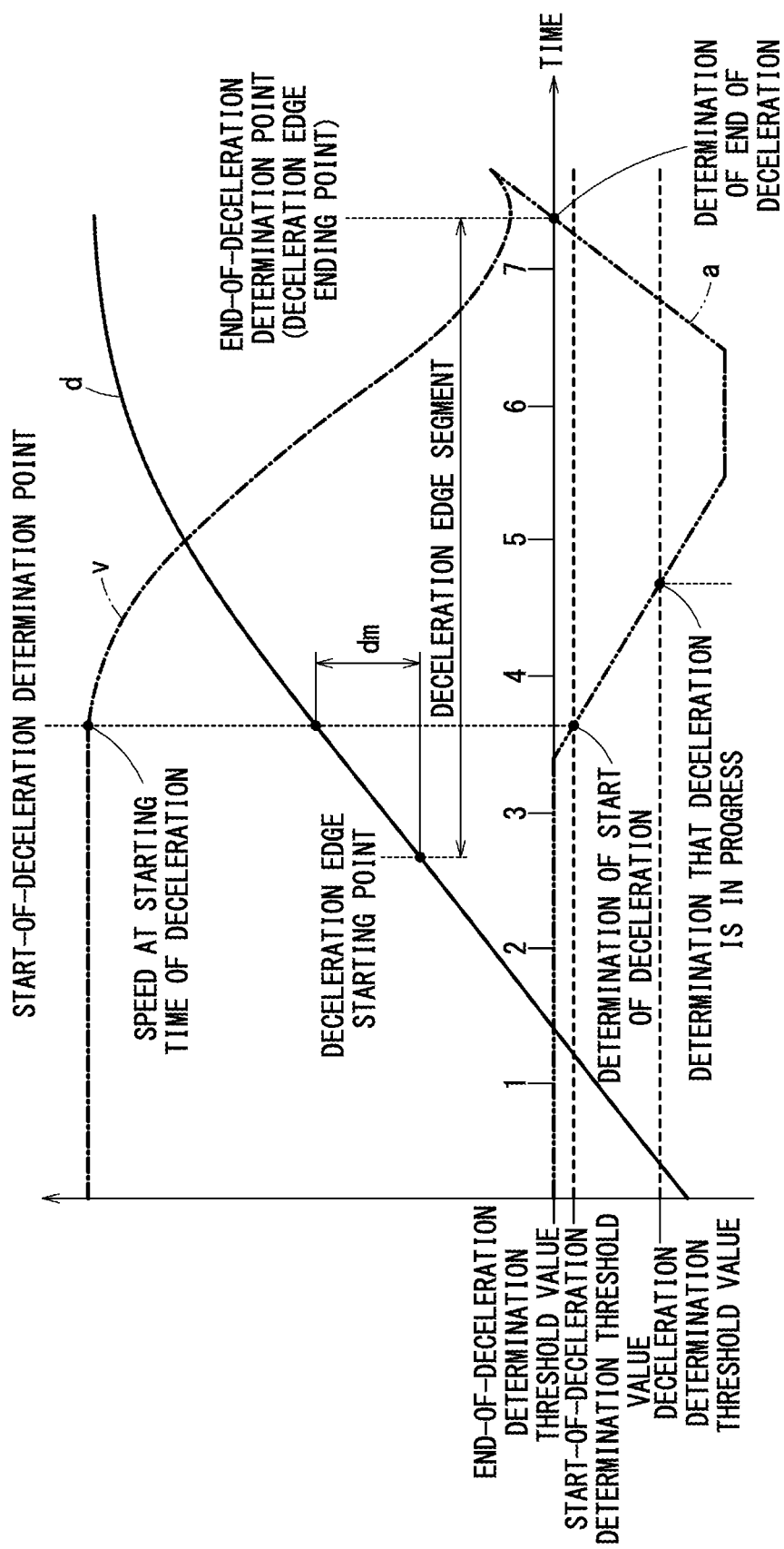
FIG. 7 is an explanatory diagram of a margin distance and the like of a deceleration edge.

FIG. 7 is an explanatory diagram of the deceleration edge.

The thick solid line indicates a movement distance (d), the thick one-dot dashed line indicates a speed (v), and the thick two-dot dashed line indicates an acceleration (a).

For convenience of understanding, on the time axis, there are set a point in time 1, a point in time 2, . . . a point in time 7 at equal intervals.

For example, it is determined that the vehicle is decelerating at a point (approximately at point in time 5.8) when the acceleration (a), which is an estimated acceleration obtained by a moving average of a difference in speed, becomes smaller than a deceleration determination threshold value.

A point at which an acceleration (a), which takes place at a point backward along the teaching route from a point where it is determined that decelerating is in progress, has become greater than a start-of-deceleration determination threshold value is defined as a deceleration start determination point, and a point further backward by a margin distance (dm) from the deceleration start determination point is defined as a deceleration edge starting point.

In this instance, the margin distance (dm) is set by multiplying an "idle running time", which is set to a fixed value or a parameter, by a "speed when deceleration is started".

If the acceleration (a) has become greater than an end-of-deceleration determination threshold value (in this instance, a value of 0), that point is determined to be a deceleration end determination point.

A target speed for the deceleration edge segment is set to a minimum edge speed, which is less than a speed for the turning edge segment and a speed for the straight edge segment.

Moreover, at a time when the acceleration (a) is determined, the sign of the acceleration is switched between the positiveness and negativeness, depending on the traveling direction.

Next, a description will be given concerning the setting of the turning edge by the node/edge conversion unit 118. In the case that an absolute value of the turning radius (v/w: where w is the angular speed) is less than a turning start threshold value, and the angular speed (w) is greater than a determination turning speed threshold value, that point is set to the starting point of the turning edge.

In the case that the absolute value of the turning radius (r=v/w) is greater than an end of turning radius threshold value, that point is set to the end point of the turning edge.

A target speed for the turning edge segment is set to an intermediate edge speed, which is greater than the speed for the deceleration edge segment and less than the speed for the straight edge segment.

Next, a description will be given concerning the setting of the straight edge segment by the node/edge conversion unit 118.

A segment, which is neither the deceleration edge segment nor the turning edge segment, is set as the straight edge segment.

A target speed for the straight edge segment is set to a maximum edge speed, which is greater than the speed for the deceleration edge segment and the speed for the turning edge segment.

Figure 8A:
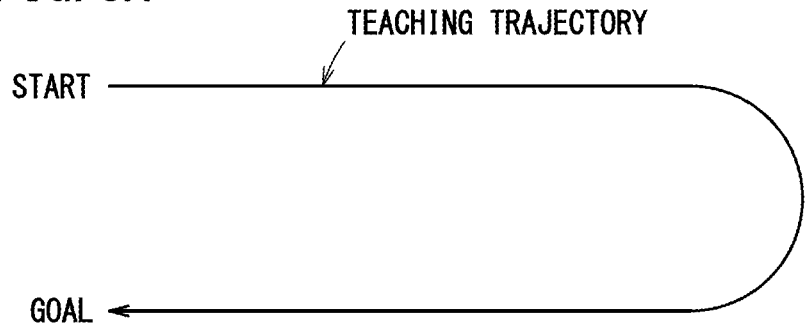
FIG. 8A is an explanatory diagram showing a teaching trajectory of a working route from a start to a goal by the working machine.

FIG. 8A shows the teaching trajectory of the working machine 12 by a manual operation of the working route from the start to the goal in relation to the process P1.

Figure 8B:
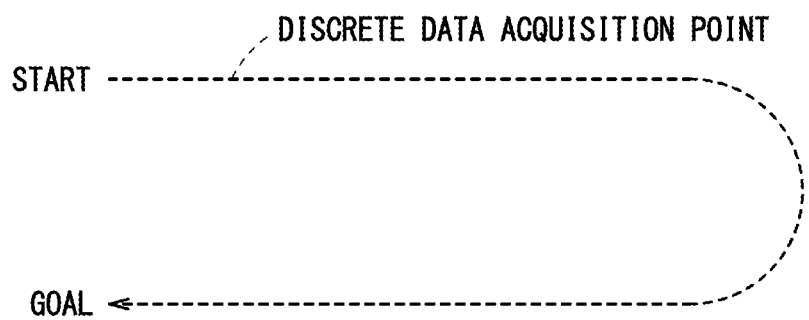
FIG. 8B is an explanatory diagram showing acquisition points of discrete data within the teaching trajectory.

FIG. 8B shows discrete data acquisition points (indicated by dots, each of which is set as a sub-goal) in relation to the process P1.

Figure 8C:
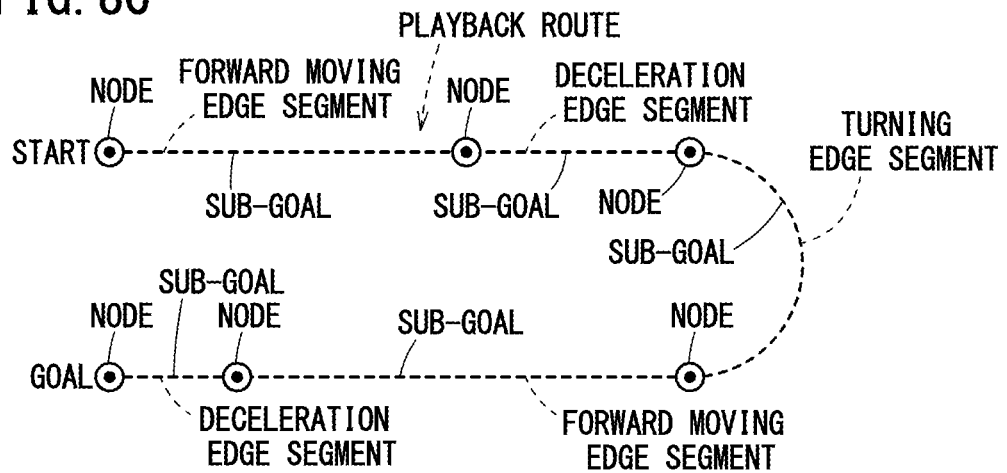
FIG. 8C is an explanatory diagram of a node/edge setting and an edge speed setting in relation to the playback data.

FIG. 8C shows the playback route after setting of the nodes in relation to the process P2, and the edge classification and speed setting in relation to the process P3 have been carried out.

Although the routes between the nodes are defined as edges, the acquisition points of the discrete data of the edges are defined as sub-goals. The sub-goals may be constituted by a plurality of continuous discrete data.

As shown in FIG. 8C, in the playback route from the starting point node to the goal point node, sequentially in this order, the segment from the starting point node to a start-of-deceleration node point where deceleration is started is defined as the straight edge segment. The segment from the start-of-deceleration node point to a start-of-turning node point is defined as the deceleration edge segment. The segment from the start-of-turning node point to an end-of-turning node point is defined as the turning edge segment. The segment from the end-of-turning node point to a start-of-deceleration point node is defined as the straight edge segment. The segment from the start-of-deceleration point node to the goal point node is defined as the deceleration edge segment.

The playback data creation unit 120 creates the playback data by collecting the execution results of the processes P1, P2, and P3.

The playback data is data obtained by converting the teaching trajectory from the start to the goal, based on the speed-related control parameters, into a playback route for the working machine in order to autonomously travel which is made up from the plurality of nodes, and the edges that are connected between the nodes.

The speed-related control parameters and the control parameters of the blades 34, which are working tools of the working mechanism 28, are registered for each of the edges on the playback route.

By accomplishing the foregoing, the playback data is automatically created by the playback data creation device 10.

A confirmation and modification process of the playback data created in a process P4 is carried out through the playback data creation unit 120.

In this case, the image display signal creation unit 124 creates an image display signal that causes there to be displayed as image information on the monitor 126, information of the teaching trajectory, information of the playback route, information of the nodes and edges on the playback route, and information of the speed-related control parameters for each of the edges, as well as tool control parameters.

By displaying an image in accordance with the image display signal on the monitor 126, the operator can easily confirm, for example, a difference between the playback route and the teaching trajectory. Further, it is possible to easily confirm whether or not the rotational speed and the height position of the blades 34 on the playback route are appropriate.

In this case, in the image display signal, there can be included an image display signal that causes there to be displayed in highlighting on the monitor 126 segments where a deviation distance between the teaching trajectory acquired by the manual operation, and the playback route is greater than or equal to a predetermined distance.

Consequently, the operator is capable of checking the accuracy of the playback data prior to the autonomous traveling operation, and further, a modification operation of the playback data is facilitated.

In a process P5, the playback data creation device 10 transfers the playback data that has been created, to the memory 51 of the control device 50 of the working machine 12 through the playback data output unit 122 and causes the playback data to be stored in the memory 51.

In a process P6, the control device 50 executes a program in relation to the playback data that is stored in the memory 51. Consequently, a working operation is carried out by the working machine 12 autonomously traveling along the working route.

The working machine 12 autonomously travels by aiming toward a sub-goal (a point forming an edge) at a distance of a set LAD (Look ahead distance) in front of the working machine.

In this case, the left and right rear wheels 26 of the working machine 12 are adjusted in speed and turning so as to follow along the playback route toward the sub-goal on the basis of the playback data.

More specifically, the speed (a forward speed or a rearward speed) and a turning speed (an angular speed) of the working machine 12 are adjusted based on the control parameters so as to follow along the playback route.

In this manner, in the working operation, which is based on the playback data, it is possible to improve the route following characteristic while varying the speed. As a result, in the playback travel trajectory for a case in which the target route, for example, is a turning route having an acute angle, it is possible to prevent the occurrence of a damped oscillatory trajectory (see FIG. 15A) accompanied by overshooting that greatly deviates from the target route or the occurrence of a first-order lag trajectory (see FIG. 15B). Accordingly, it is possible to significantly improve a worsening of the travel following characteristic in the playback route. In addition, since the speed is variable, the working time period can be shortened in comparison with carrying out such working at a constant speed.

Figure 14:
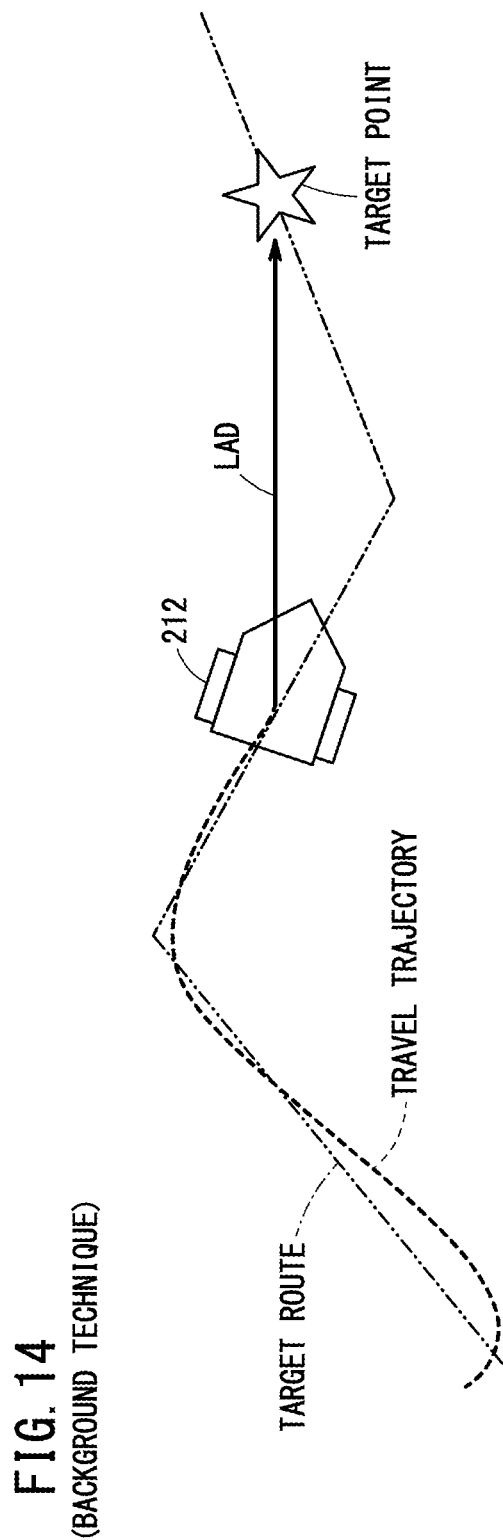
FIG. 14 is a schematic explanatory diagram of a pure pursuit method, which is a well-known route following algorithm for the purpose of autonomous movement.

As shown in FIG. 14 (a background technique), Pure pursuit method is a method of successively determining, with respect to a preset target route, a point that is at a constant distance (LAD: look ahead distance) ahead of the current position of the moving body 212, as a target point, and following the target point. Such a target point is referred to as a forward gazing point.

In the Pure pursuit method, the moving body is controlled such that a turning control so as to arrive at the target point is realized.

In the Pure pursuit method, due to the characteristics of the algorithm, as will be described hereinafter, a problem arises in that the following accuracy disadvantageously becomes low when traveling at a high speed or on a complicated route.

Figure 15A:
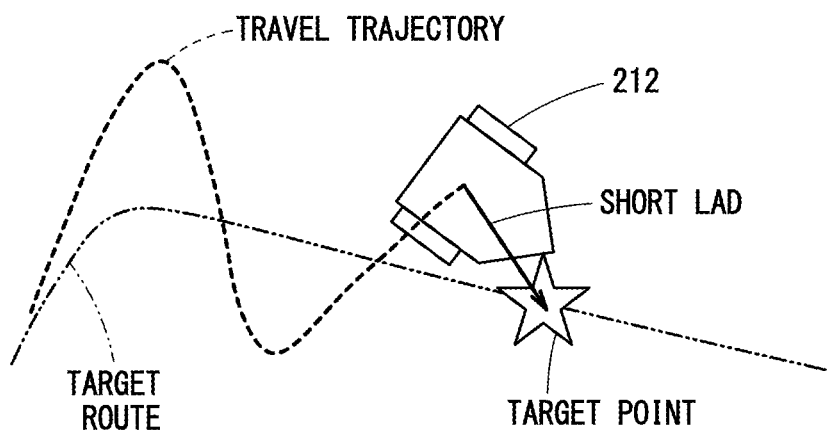
FIG. 15A is an explanatory diagram of a task of the pure pursuit method.

As shown in FIG. 15A (a background technique), when a short LAD is set, overshooting and vibration occurs in the travel trajectory of the moving body 212, and a swinging behavior occurs with respect to the target route.

Figure 15B:
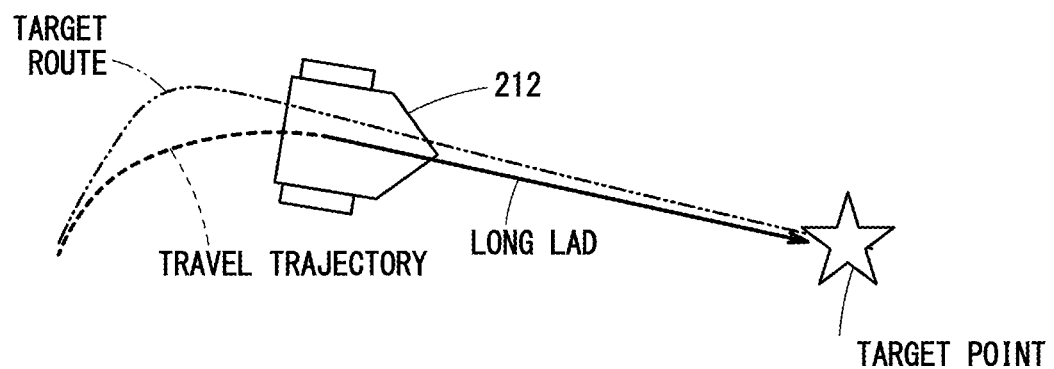
FIG. 15B is an explanatory diagram of another task of the pure pursuit method.

As shown in FIG. 15B (a background technique), when a long LAD is set, a shortcut occurs in the travel trajectory of the moving body 212 in close proximity to a corner of the target route. As a result, for example, the following characteristic of the moving body 212 on a complicated target route is significantly reduced. Due to the reduction of the following characteristic, a region in which working remains uncompleted such as a region in which cutting remains uncompleted or the like is generated.

In contrast thereto, according to the present embodiment, as noted previously, in the playback route for a case in which the target route, for example, is a turning route having an acute angle, it is possible to prevent the occurrence of a damped oscillatory trajectory (see FIG. 15A) accompanied by overshooting that greatly deviates from the target route or the occurrence of a first-order lag trajectory (see FIG. 15B). Accordingly, it is possible to significantly improve the deterioration of the travel following characteristic in the playback route.

[Setting of the Normal Node and the Special Node]

Figure 9:
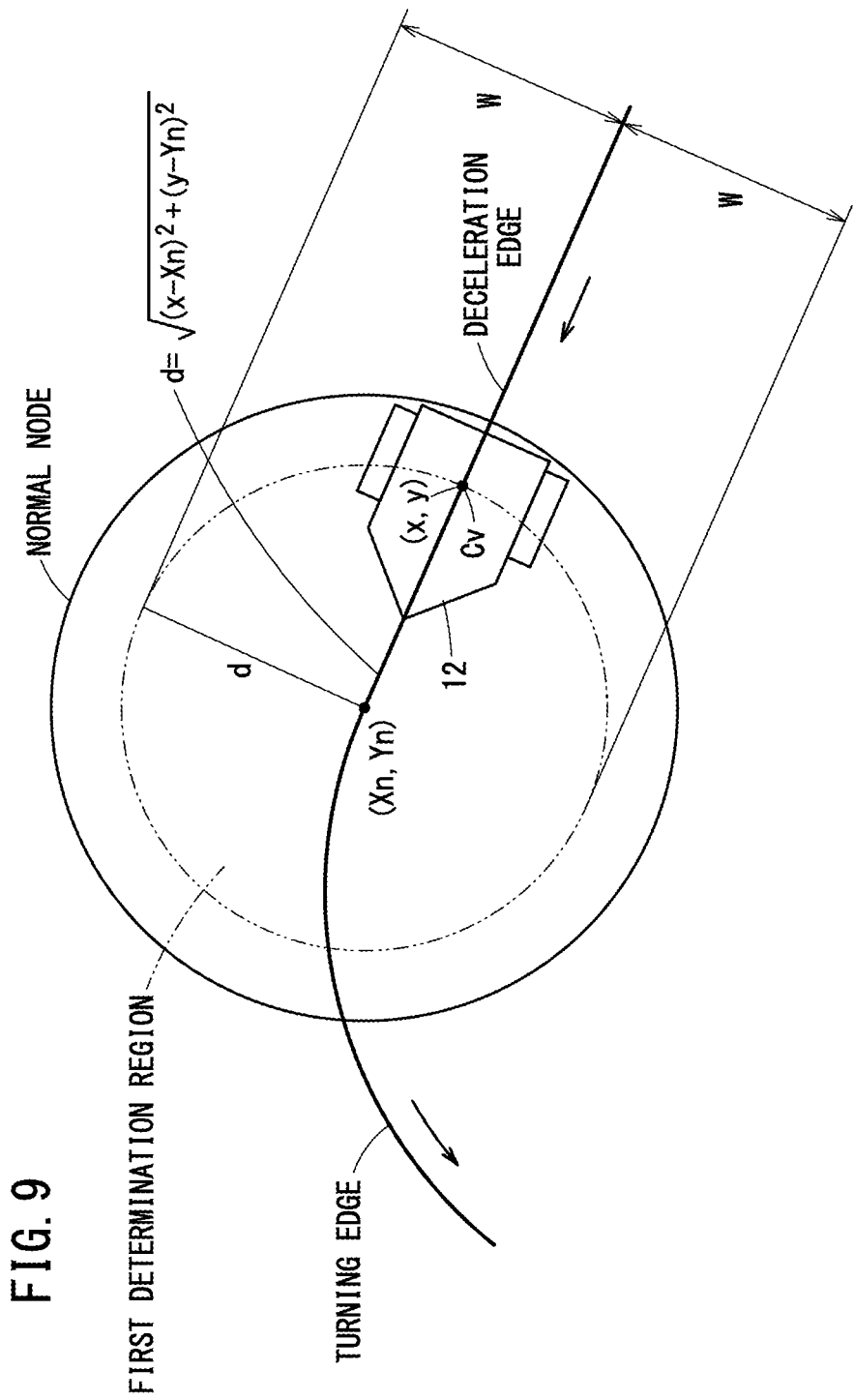
FIG. 9 is an explanatory diagram of a determination region of a normal node.

As shown in FIG. 9, in terms of implementation, unlike the sub-goal which is defined as a point, the node is defined as a region, having a certain shape (a closed region), for determining whether the working machine 12 has arrived at the node (also simply referred to as a determination region).

On the playback route, for example, a node at which the deceleration edge segment shown in FIG. 9 is changed to the turning edge segment without the working machine stopping is set as a normal node having a first determination region.

The normal node is set as a set of positions (x, y) that lie within a constant distance d ($d=\sqrt{\{(x-Xn)^2+(y-Yn)^2\}}$) from the reference position (Xn, Yn) of the determination region for the center position Cv of the axle of the rear wheels 16 of the working machine 12.

The normal node includes a circular first determination region for determining that the working machine 12 has arrived at the determination region. The reference position (Xn, Yn) of the first determination region is the center of the circle.

The first determination region is normally a circular shape, but may be a regular polygonal shape of a four-sided (quadrangular) shape or more. In the case of being a circular shape, in order to facilitate understanding, the normal node is also referred to as a circular node.

In actuality, in FIG. 9, along the deceleration edge within a target lateral width W in the drawing, the center position Cv of the working machine 12 moves forward toward the normal node with the reference position (Xn, Yn) of the normal node serving as a target node (a target point through which the working machine passes).

In this case, at a time when the working machine 12 enters into the first determination region of the normal node, moves further forward, and then the center position Cv of the axle of the rear wheels 16 of the working machine 12 has become positioned at a constant distance d from the reference position (Xn, Yn) of the first determination region, a determination is made that the working machine 12 has arrived at the normal node.

Stated otherwise, during forward movement thereof, when the center position Cv of the axle of the rear wheels 16 of the working machine 12 has arrived at a point on the circumference of an imaginary arrival determination circle as shown by the two-dot dashed line, a determination is made that the working machine 12 has arrived at the normal node.

At the arrival determination point, the working machine 12 starts moving forward while turning at the angular speed that is set in the control parameter, and without coming to a stop, the working machine moves forward while maintaining the turning angle, along the turning edge (toward the turning edge, in the case of deviating from the turning edge).

In the case of including the stopping position where the working machine comes to a stop on a travel route and the control parameter is changed, such as a K-turn, a left or right turn, and arrival at the goal, which will be described below, the node is changed from the normal node having the first determination region (see FIG. 9) to the special node having the later-described second determination region.

In this case, in the aforementioned process P2, the node/edge conversion unit 118 sets a normal node or a special node, on the basis of the following basic conditions 1 and 2, and the detailed conditions A to D.

(Basic Condition 1) A normal node is set including a non-stopping position where the control parameter is changed without coming to a stop on the travel route, and having the first determination region to determine that the working machine 12 has arrived at the non-stopping position which lies within a constant distance in a radial direction from the center of the node.

(Basic Condition 2) A special node is set including a stopping position where the control parameter is changed by coming to a stop on the travel route, and having an imaginary arrival determination line for determining that the working machine 12 has arrived at the node, the imaginary arrival determination line passing through the stopping position.

(Detailed Condition A) The start is set to the normal node, and the goal is set to the special node.

(Detailed Condition B) The deceleration data is calculated from the traveling speed data, or alternatively, the deceleration data, which is detected by the acceleration sensor 64, is acquired, and a deceleration occurrence position where the deceleration is less than or equal to the deceleration threshold value, is set to the normal node. The deceleration occurrence position may be obtained by a moving average of a difference in speed.

(Detailed Condition C) The turning radius of the working machine 12 is calculated from the traveling speed data and the angular speed data, and a segment in which the turning radius is less than or equal to the turning radius threshold value is set as a turning segment. Then, the starting point and the ending point of the turning segment are set to the normal node.

(Detailed Condition D) A node including a stopping position where a turn in which a large turning radius and a narrow width, i.e., a so-called K-turn, is performed, is set as a special node for making the K-turn. More specifically, a node where, during the K-turn, the control parameter is changed to a stop after a forward movement with one-side turning has been performed and furthermore the control parameter is changed from the stop to a rearward movement with opposite-side turning at the stopping position on the imaginary arrival determination line, is set to a special node.

(Detailed Condition E) A node where the control parameter is changed from the stop to a right turning or a left turning at the stopping position on the imaginary arrival determination line, and after turning, the control parameter is further changed to a forward movement, is set to a special node.

FIG. 10A is an explanatory diagram of a normal node in a comparative example in which a K-turn is carried out. The K-turn is a turning method in a narrow space, i.e., moving forward→turning to one side→moving rearward→turning to opposite side→moving forward (not shown in FIG. 10A). The K-turn is usually made in the case that the width of the road is too narrow and a U-turn cannot be performed.

In the playback route of the comparative example shown in FIG. 10A, in which the control parameter is changed from a forward turning edge to a rearward turning edge, the arrival determination is made at a constant distance d away from the center position (Xn, Yn) of the normal node, and stopping is carried out.

Therefore, on the playback route, a portion that is positioned in the vicinity of the center position (Xn, Yn) (in close proximity to the turning position) is not followed disadvantageously, and thus that portion becomes a uncut region of the blades 34 of the working mechanism 28 in which cutting remains uncompleted (refer to FIG. 10A).

FIG. 10B is an illustration of a special node in accordance with an embodiment in which such a K-turn is carried out. The special node includes a quadrangular second determination region. At the special node, the reference position (Xn, Yn) shown in FIG. 10A is set to a stopping position {also referred to as a stopping position (Xn, Yn)}.

Moreover, in FIG. 9, FIG. 10A, and FIG. 10B, for convenience of understanding, the size of the model of the working machine 12 is drawn to be smaller than the size of the normal node and the special node. In actuality, the area of the normal node and the special node is set to be smaller than the projected area of the working machine 12. FIG. 12A, FIG. 12B, FIG. 13A, and FIG. 13B, which will be described hereinafter, are drawn in a similar manner. Incidentally, the projected area (the size) of the working machine 12 used for the lawn mowing operation, for example, is on the order of 2 [m] in total length×1.5 [m] in total width.

The special node shown in FIG. 10B includes a stopping position (Xn, Yn) where the working machine comes to a stop on a travel route and the control parameter is changed from forward turning (i.e., forward movement with turning) to rearward turning (i.e., rearward movement with turning), and the special node further includes an imaginary arrival determination line 201 indicated by the two-dot dashed line that passes through the stopping position (Xn, Yn), for determining that the working machine 12 has arrived at the second determination region.

More specifically, the special node includes a quadrangular shaped second determination region for determining whether the center position Cv of the axle of the rear wheels 16 of the working machine 12 has arrived at the imaginary arrival determination line 201.

At a position (the stopping position of the working machine 12) on the imaginary arrival determination line 201, the control parameter of the working machine 12 is changed from forward turning to rearward turning.

In FIG. 10B, up to the imaginary arrival determination line 201 in the second determination region, the control parameter is set to forward movement with one-side turning, and at a position on the imaginary arrival determination line 201, the control parameter is changed to the stop.

Furthermore, on the imaginary arrival determination line 201 (at the stopping position (Xn, Yn) shown in FIG. 10B or at another stopping position along the imaginary arrival determination line 201), the control parameter is changed from the stop to the rearward turning.

The second determination region includes a specified peripheral edge 202 that is parallel to the imaginary arrival determination line 201, and into which the working machine 12 is intended to enter. A length Lf on the front side, from the imaginary arrival determination line 201 to the specified peripheral edge 202 is set to be shorter than a length Lb from the imaginary arrival determination line 201 to a peripheral edge 204 that is on the back side (Lf<Lb), and further, the specified peripheral edge 202 (on the entry side) into which the working machine is intended to enter, of the second determination region, is a straight line.

Although the second determination region shown in FIG. 10B is a regular quadrilateral (square) shape, the second determination region is not limited to being a square shape, and may be a rectangular shape, which is a quadrangle shape, a trapezoidal shape which is a quadrangle shape the base of which forms the peripheral edge 202, or may be a regular pentagonal shape or the like. A rectangular shape or a square shape is preferred.

As shown in FIG. 10B, the working machine 12 is equipped with the position sensor 66 (see FIG. 1) that detects the position of the working machine 12 itself, and one or more processors that execute computer-executable instructions that are stored in a memory. By the computer-executable instructions being executed by the one or more processors, the working machine 12 determines whether or not the position (the center position Cv of the axle of the rear wheels 16 of the working machine 12) detected by the position sensor 66 of the working machine 12 has arrived at the second determination region of the special node.

Figure 11A:
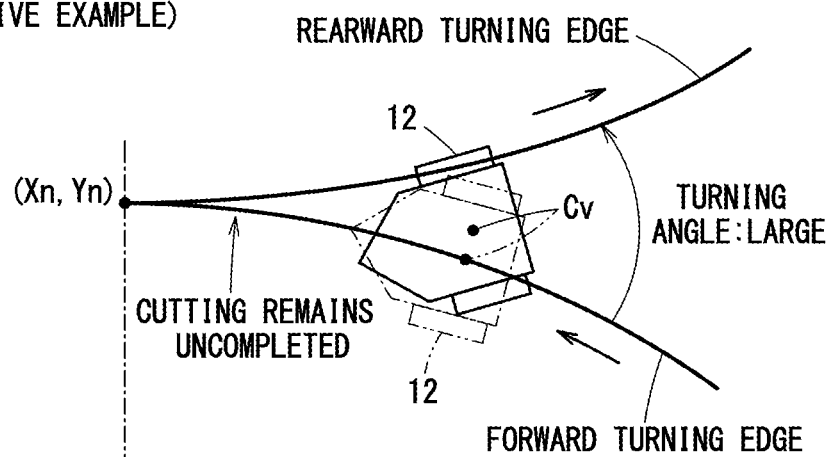
FIG. 11A is a schematic diagram for describing a route following characteristic for a case in which the working machine makes a K-turn at a normal node in the comparative example.

FIG. 11A is a schematic diagram for describing a route following characteristic for a case in which the working machine 12 makes a K-turn at the normal node (see FIG. 10A) in the comparative example.

Figure 11B:
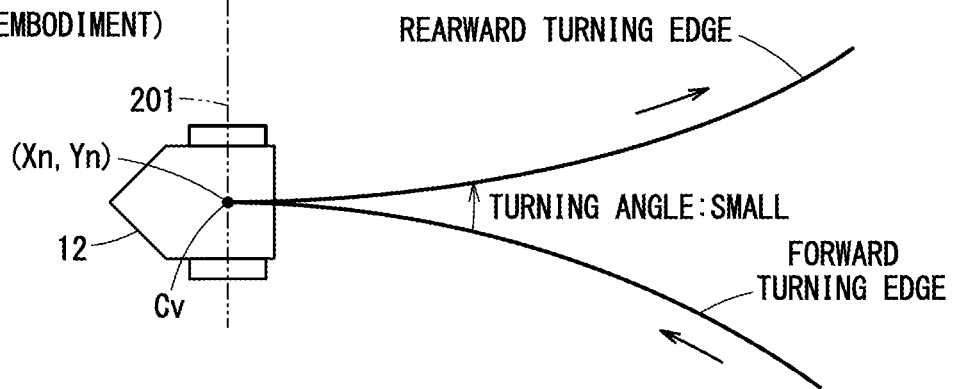
FIG. 11B is a schematic diagram for describing a route following characteristic for a case in which the working machine makes a K-turn at a special node in the embodiment.

FIG. 11B is a schematic diagram for describing a route following characteristic for a case in which the working machine 12 makes a K-turn at a special node (see FIG. 10B) in the embodiment.

As shown in FIG. 11A, in the case that the working machine 12 makes a K-turn at the normal node (see FIG. 10A) in the comparative example, the turning angle of the working machine 12 becomes relatively large, and the route following characteristic deteriorates.

In contrast thereto, as shown in FIG. 11B, in the case that the working machine 12 makes a K-turn at the special node (see FIG. 10B) in the embodiment, the turning angle of the working machine 12 becomes relatively small, and the route following characteristic does not deteriorate.

Exemplary Modifications

The above-described embodiment can be modified in the following manner.

Exemplary Modification 1

The same reference numerals are used to designate the same constituent elements as those in the above-described embodiment, and only different portions thereof will be described.

Figure 12A:
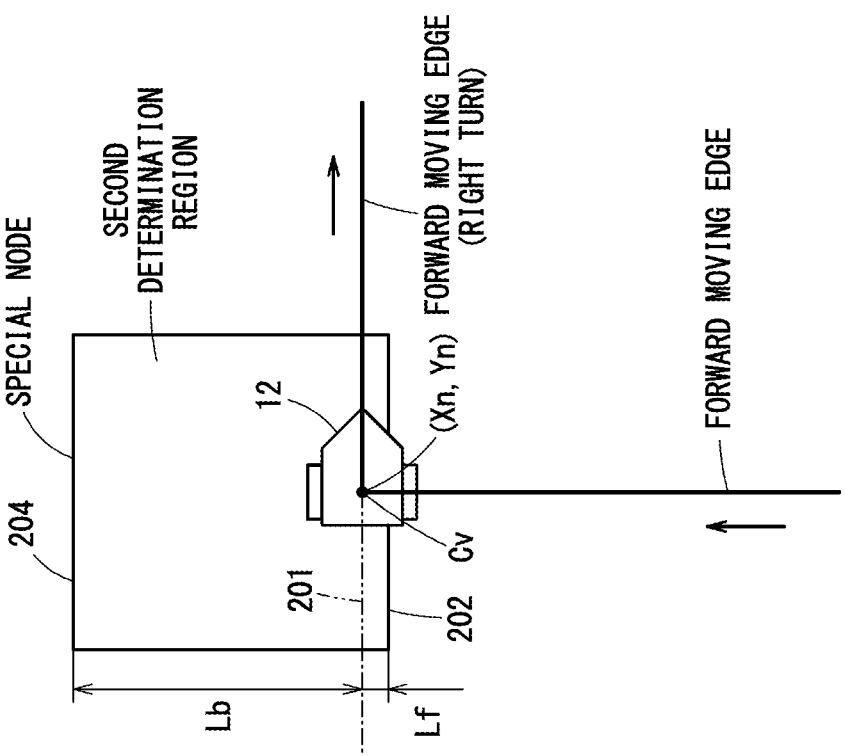
FIG. 12A is a schematic diagram for describing a route following characteristic for a case in which the working machine makes a right turn at a normal node in a Comparative Example 1.

FIG. 12A is a schematic diagram for describing a route following characteristic for a case in which the working machine 12 turns at an acute angle turning point in the normal node (see FIG. 12A) in a Comparative Example 1, and then makes a right turn from a forward edge to a right turn edge.

Figure 12B:
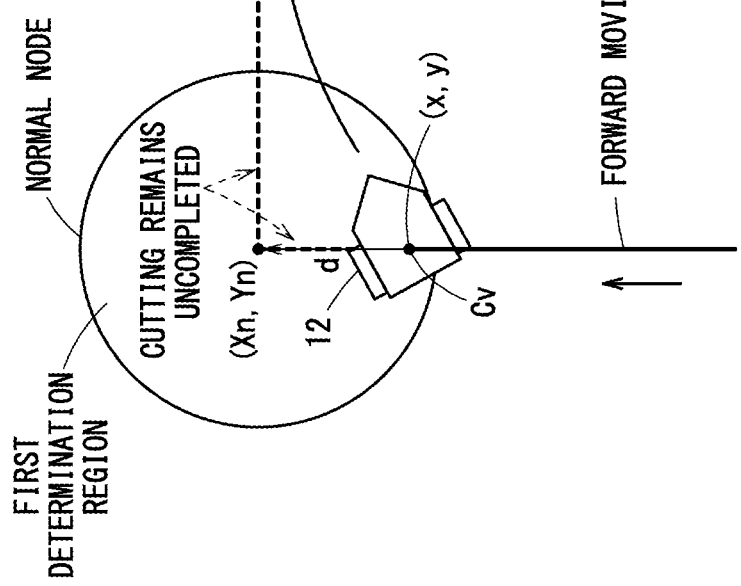
FIG. 12B is a schematic diagram for describing a route following characteristic for a case in which the working machine makes a right turn at a special node in an Exemplary Modification 1.

FIG. 12B is a schematic diagram for describing a route following characteristic for a case in which the working machine 12 makes a right turn from the forward edge to the right turn edge by making an ultra-pivot turn at the special node in the Exemplary Modification 1.

As shown in FIG. 12A, in the case that the working machine 12 makes a right turn at the normal node in the Comparative Example 1 that is set at the acute angle turning point, the actual trajectory deviates from an ideal right angle right turn trajectory that passes through a center coordinate (Xn, Yn) of the normal node.

More specifically, the working machine 12 makes a turn at a coordinate (x, y) before the center coordinate (Xn, Yn)

of the normal node. As a result, a large uncut region in which cutting remains uncompleted occurs, and the route following characteristic deteriorates.

In contrast thereto, as shown in FIG. 12B, in the case that the working machine 12 makes a right turn at the special node in the Exemplary Modification 1, in the second determination region, the control parameter changes such that the working machine stops at the stopping position (Xn, Yn) on the imaginary arrival determination line 201, next makes a right turn by making an ultra-pivot turn, and then after having turned, moves forward.

In this manner, by setting the special node in which the second determination region is provided, it is possible to reduce the uncut region in which working remains uncompleted.

Similarly, even when making a left turn, it can be understood that the uncut region in which working remains uncompleted can be reduced.

Exemplary Modification 2

The same reference numerals are used to designate the same constituent elements as those in the above-described embodiment and the Exemplary Modification 1, and only different portions thereof will be described.

FIG. 13A shows a state in which the working machine 12, which has moved forward along the deceleration edge toward the stopping position (Xn, Yn) of the goal (which is also referred to as the goal node) that is set in the normal node of the Comparative Example 2, is stopped at a position that is a constant distance d from a reference position (Xn, Yn) of the first determination region. Stated otherwise, the working machine 12 is stopped at a position where the working machine is determined to have arrived at the goal.

In this manner, when the goal node is a normal node including the first determination region, an uncut region in which cutting remains uncompleted occurs in front of the working machine 12, and the route following characteristic deteriorates.

In contrast thereto, as shown in FIG. 13B, in the case that the working machine 12 has set the special node of the Exemplary Modification 2 as the goal node, then in the second determination region, the stopping position (Xn, Yn) on the imaginary arrival determination line 201 is set to the goal (Xn, Yn) position where the control parameter is changed from forward deceleration to stop.

In this manner, by setting the special node in which the second determination region is provided, it is possible to reduce the uncut region in which working remains uncompleted at the time when the goal is reached. Stated otherwise, it is possible to avoid a situation in which the route following characteristic is reduced.

In the aforementioned process P4, the image display signal is created in order to display on the monitor 58 (126) the working route, and the shape of the first determination region and the rectangular shape of the second determination region that are set on the working route.

In accordance with this feature, in particular, the situation of the uncut region in which working remains uncompleted in close proximity to a stop and turning position and at the goal can be easily confirmed and modified on the monitor 58 (126) prior to performing the work.

Inventions that can be Grasped from the Embodiment

A description will be given below concerning portions of the invention that are capable of being grasped from the above-described embodiment and the Exemplary Modifications 1 and 2. Moreover, in order to facilitate understanding, the reference numerals used in the above embodiment and Exemplary Modifications (1-2) are applied in relation to the portions of the constituent elements, however, the constituent elements are not limited to those to which those reference numerals are applied.

(1) The route data creation device according to the present invention creates the travel route from the start to the goal of the working machine 12 which is capable of traveling autonomously on the basis of the teaching trajectory, the route data creation device including the one or more processors that execute the computer-executable instructions stored in the memory, wherein, the one or more processors execute the computer-executable instructions to cause the route data creation device to: register, for each of the discrete positions along the travel route, the speed-related control parameter acquired at the time when the teaching trajectory is acquired; set, on the travel route, the normal node containing the non-stopping position where the value of the control parameter is changed, and the special node containing the stopping position where the value of the control parameter is changed; set, in the normal node, the first determination region to determine that the working machine has arrived at the non-stopping position which lies at a constant distance in the radial direction from the center of the normal node; and set, in the special node, the second determination region having the imaginary arrival determination line to determine that the working machine has arrived at the stopping position.

In the present invention, the nodes on the travel route are classified into a special node and a normal node, depending on whether or not stopping occurs on the travel route, and are set. The special node includes a stopping position where the working machine comes to a stop on the travel route and a control parameter is changed, and further includes an imaginary arrival determination line in order to determine that the working machine has arrived at the second determination region, the imaginary arrival determination line passing through the stopping position. Compared to a case in which the normal node is set, an uncut region in which working remains uncompleted can be reduced.

(2) Further, in the route data creation device, in the second determination region, the control parameter is changed to a stop, after a forward movement with one-side turning has been performed, and furthermore, the control parameter is changed from the stop to a rearward movement with opposite-side turning, at the stopping position on the imaginary arrival determination line.

In accordance with such a configuration, at a time of traveling in a K-turn, it is possible to reduce the uncut region in which working remains uncompleted.

(3) Furthermore, concerning the route data creation device, in the second determination region, the control parameter is changed from a stop to a right turning or a left turning, at the stopping position on the imaginary arrival determination line, and after the right or left turning, the control parameter is changed to a forward movement.

In accordance with such a configuration, at a time when turning to the right or at a time when turning to the left, it is possible to reduce the uncut region in which working remains uncompleted.

(4) Further still, in the route data creation device, the special node is set to the goal. In accordance with such a configuration, at the goal, it is possible to reduce the uncut region in which working remains uncompleted.

(5) Still further, in the route data creation device, the second determination region includes the specified peripheral edge into which the working machine is intended to enter, and a length (Lf) on the front side, from the imaginary arrival determination line (201) to the specified peripheral edge (202) is set to be shorter than a length (Ld) length (Lb) from the imaginary arrival determination line to the peripheral edge (204) that is on the back side, and further, the specified peripheral edge, of the second determination region, into which the working machine is intended to enter is a straight line.

In accordance with such a configuration, in the case that the turning on the imaginary arrival determination line is performed for making a K-turn, for example, the uncut region in which working remains uncompleted in the second determination region can be reduced, and further, the turning angle of the working machine at the center of turning can be reduced. Further, in the case that the turning on the imaginary arrival determination line, for example, is performed for making a right turn or a left turn, the uncut region in which working remains uncompleted in the second determination region can be reduced. Furthermore, by setting the special node that includes an imaginary arrival determination line to the goal node, it is possible to reduce the uncut region in which working remains uncompleted at the goal.

(6) Further still, in the route data creation device, the second determination region is formed in a rectangular shape. In accordance with such a configuration, creation of the second determination region which is capable of increasing the route following characteristic is facilitated.

(7) Further still, in the route data creation device, the one or more processors execute the computer-executable instructions to cause the route data creation device to create the image display signal in order to display, on the monitor, as images, the working route, the shape of the first determination region, which is set on the working route, and the rectangular shape of the second determination region, which is set on the working route.

In particular, the situation of the uncut regions in which working remains uncompleted in close proximity to a stop and turning position and at the goal can be easily confirmed and modified on the monitor prior to performing the work.

(8) Further still, the working machine (12) according to the present invention is capable of traveling autonomously along the travel route on the basis of the teaching trajectory, wherein: the control parameter concerning the speed acquired at a time when the teaching trajectory is acquired is registered for each of the discrete positions along the travel route; on the travel route, there are set the normal node containing the non-stopping position where the value of the control parameter is changed, and the special node containing the stopping position where the value of the control parameter is changed; in the normal node, the first determination region is set to determine that the working machine has arrived at the non-stopping position which lies at the constant distance (d) in a radial direction from the center of the normal node; and in the special node, the second determination region is set having the imaginary arrival determination line to determine that the working machine has arrived at the stopping position, the working machine including the position sensor (66) configured to detect the position of the working machine itself, and one or more processors configured to execute the computer-executable instructions stored in the memory, wherein, the one or more processors execute the computer-executable instructions to cause the working machine to determine whether or not the position of the working machine itself detected by the position sensor has arrived at the position on the imaginary arrival determination line.

In accordance with such a configuration, the working machine capable of reducing the uncut region in which work remains uncompleted is provided.

Moreover, it should be noted that the present invention is not limited to the disclosure described above, and various configurations can be adopted therein without departing from the essence and gist of the present invention.

The invention claimed is:

1. A route data creation device configured to create a travel route from a start to a goal of a working machine configured to travel autonomously, based on a teaching trajectory, the route data creation device comprising:
one or more processors that execute computer-executable instructions stored in a memory,
wherein the one or more processors execute the computer-executable instructions to cause the route data creation device to:
register, for each of discrete positions along the travel route, a speed-related control parameter acquired at a time when the teaching trajectory is acquired;
set, on the travel route, a normal node containing a non-stopping position where a value of the control parameter is changed, and a special node containing a stopping position where a value of the control parameter is changed;
set, in the normal node, a first determination region to determine that the working machine has arrived at the non-stopping position which lies at a constant distance in a radial direction from a center of the normal node; and
set, in the special node, a second determination region which has an imaginary arrival determination line to determine that the working machine has arrived at the stopping position.

2. The route data creation device according to claim 1, wherein, in the second determination region, the control parameter is changed to a stop, after a forward movement with one-side turning has been performed, and furthermore, the control parameter is changed from the stop to a rearward movement with opposite-side turning, at the stopping position on the imaginary arrival determination line.

3. The route data creation device according to claim 1, wherein, in the second determination region, the control parameter is changed from a stop to a right turning or a left turning, at the stopping position on the imaginary arrival determination line, and after the right or left turning, the control parameter is changed to a forward movement.

4. The route data creation device according to claim 1, wherein the special node is set to the goal.

5. The route data creation device according to claim 1, wherein: the second determination region includes a specified peripheral edge into which the working machine is intended to enter; a length on a front side, from the imaginary arrival determination line to the specified peripheral edge is set to be shorter than a length from the imaginary arrival determination line to a peripheral edge that is on a back side; and the specified peripheral edge, of the second determination region, into which the working machine is intended to enter is a straight line.

6. The route data creation device according to claim 5, wherein the second determination region is formed in a rectangular shape.

7. The route data creation device according to claim 6, wherein, the one or more processors execute the computer-executable instructions to cause the route data creation device to:

create an image display signal in order to display, on a monitor, as images, a working route, a shape of the first determination region, which is set on the working route, and the rectangular shape of the second determination region, which is set on the working route.

8. A working machine configured to travel autonomously along a travel route based on a teaching trajectory, wherein:

a speed-related control parameter acquired at a time when the teaching trajectory is acquired is registered for each of discrete positions along the travel route;

on the travel route, there are set a normal node containing a non-stopping position where a value of the control parameter is changed, and a special node containing a stopping position where a value of the control parameter is changed;

in the normal node, a first determination region is set to determine that the working machine has arrived at the non-stopping position which lies at a constant distance in a radial direction from a center of the normal node; and in the special node, a second determination region is set having an imaginary arrival determination line to determine that the working machine has arrived at the stopping position, the working machine comprising:

a position sensor configured to detect a position of the working machine itself; and one or more processors configured to execute computer-executable instructions stored in a memory, wherein, the one or more processors execute the computer-executable instructions to cause the working machine to determine whether or not the position of the working machine itself detected by the position sensor has arrived at a position on the imaginary arrival determination line.

\* \* \* \* \*